Dec. 31, 1957 G. BLOEMENDAAL 2,818,295
EGG BASKET
Filed May 28, 1954 2 Sheets-Sheet 1

Gerald Bloemendaal
INVENTOR.

Dec. 31, 1957     G. BLOEMENDAAL     2,818,295
EGG BASKET
Filed May 28, 1954     2 Sheets-Sheet 2
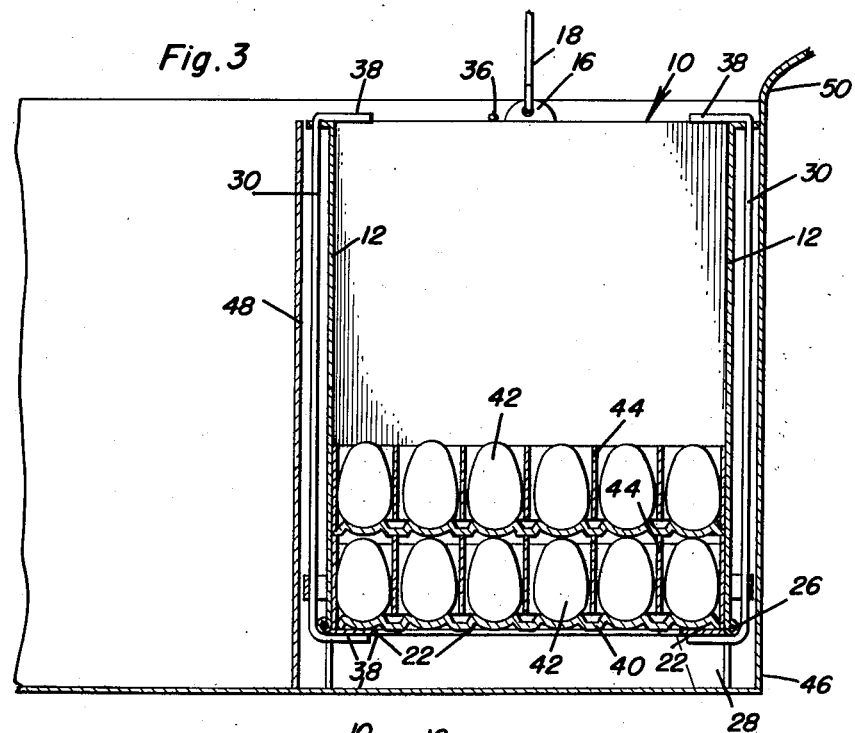
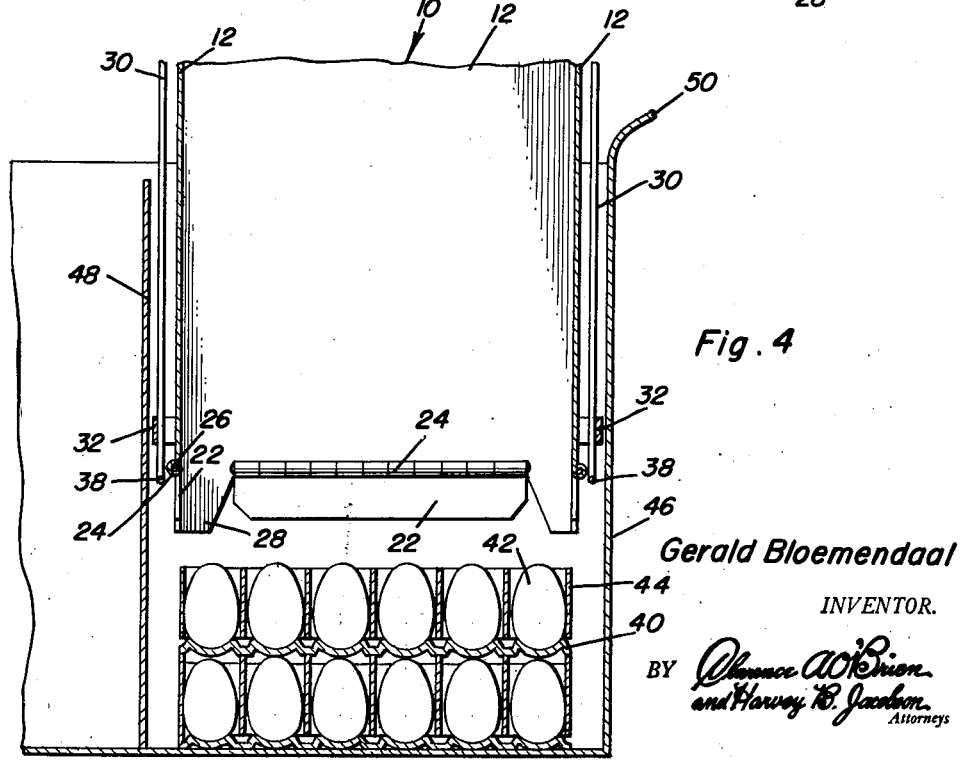
Gerald Bloemendaal
INVENTOR.

United States Patent Office 2,818,295
Patented Dec. 31, 1957

2,818,295

EGG BASKET

Gerald Bloemendaal, Orange City, Iowa

Application May 28, 1954, Serial No. 433,192

2 Claims. (Cl. 294—26.5)

This invention relates to an egg basket and more specifically provides a device for facilitating the collection of eggs from the individual nests and placing them in an egg case.

Egg shipping or marketing cases usually consist of two compartments which each include a plurality of layers of eggs positioned in fillers and separated by means of mapes which are made of relatively stiff, pressed paper molded with three dozen concave bowls in which one end of each egg rests. The filler is placed over the mapes and separate the eggs from each other. Normally, a person gathering eggs places them in a basket or the like and then transfers them from the gathering basket to the shipping case and frequently during the collection and transfer eggs may be broken or cracked. Therefore, it is the primary object of the present invention to facilitate the collection of the eggs and to transfer the eggs from the egg basket directly into the shipping case without re-handling the eggs.

Another object of this invention is to provide an egg basket having means for temporarily supporting a plurality of mapes and fillers in stacked relation and then easily and quickly depositing the stacked mapes and fillers in one-half of the shipping case without handling the individual eggs during the transfer process.

A still further object of this invention is to provide an egg basket substantially similar in size to one-half of an egg case and having pivotal projections extending partially across the open bottom of the device for temporarily supporting stacked mapes and egg fillers wherein the device may be inserted in one-half of an egg case and the pivotal projections retracted thereby permitting the mapes and egg fillers to be deposited within the egg case in the usual stacked relation and permitting the egg basket to be withdrawn for collection of more eggs.

Still another important object of this invention is to provide an egg basket having a detachable flexible bag alongside thereof for collecting small eggs or dirty eggs or the like and also provided with a clip for holding the separating mapes and fillers.

Yet another object of this invention is to provide an egg basket which is simple in construction, efficient in operation, easy to use, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
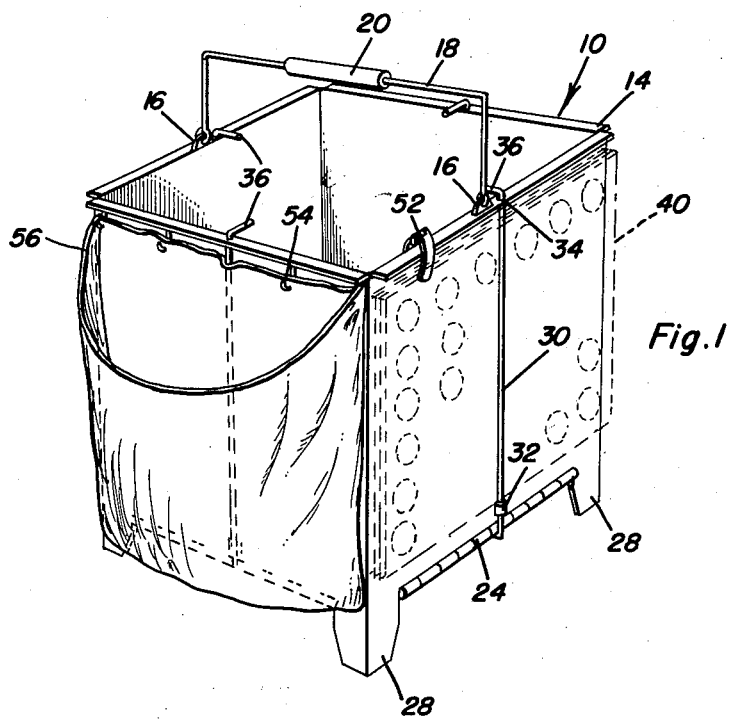
Figure 1 is a perspective view showing the egg basket of the present invention.
Figure 2:
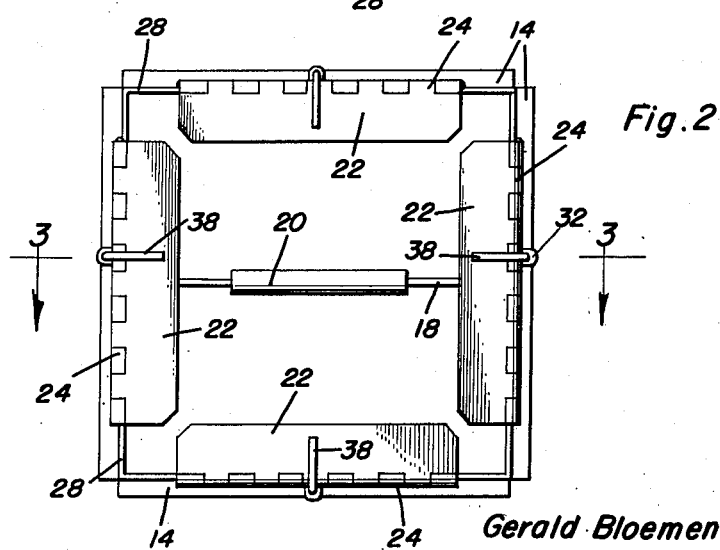
Figure 2 is a bottom plan view of the construction of Figure 1 showing the pivotal straps mounted on each side wall of the egg basket of the present invention.

Figure 3 is a longitudinal, vertical sectional view taken substantially along section line 3—3 of Figure 2 showing the details of construction of the egg basket of the present invention and showing the relationship thereof when the egg basket is positioned in one-half of an egg case; and Figure 4 is a longitudinal, vertical sectional view similar to Figure 3 showing the pivotal projecting straps in parallel relation to the side walls and the egg basket being withdrawn from one-half of the egg case and leaving the stacked mapes and egg fillers in the egg case.

Referring now specifically to the drawings, it will be seen that the numeral 10 generally designates the egg basket of the present invention having four side walls 12 which form a rectangular enclosure having an open upper end and an open bottom end. The upper edges of the side walls 12 are provided with an outwardly extending flange 14 and two of the opposing flanges 14 are provided with centrally located upstanding loops 16 for receiving the leg portions of a U-shaped handle 18 having a hand-grip 20 centrally positioned on the bight portion thereof. The handle 18 is pivotally secured to the loops 16 for positioning adjacent the projecting flanges 14 in collapsed position. The lower edge of each of the walls 12 is provided with an elongated projecting flap or strap 22 secured along the lower edge by suitable hinge means 24 having a hinge pin 26 extending therethrough and forming a pivot axis for the projecting flanges 22 which may be positioned in a parallel condition in relation to the side walls 12 or at right angles thereto.

The ends of the projecting flanges 22 are spaced from the ends of the side walls 12 and the abutting edges of the side walls 12 are provided with depending supporting legs 28 which are generally right angular in configuration and depend a distance at least equal to the width of the flanges 22 wherein the legs 28 support the walls 12 in spaced relation to a supporting surface to permit swinging movement of the flanges 22.

An elongated actuating rod 30 is slidably positioned on each of the side walls 12 by a loop guide 32 adjacent the lower edge and an aperture 34 in the upper flange 14 thereby guiding the rotational movement of the rod 30. The rod 30 includes a laterally projecting handle portion 36 at its upper end and a laterally extending flange engaging portion 38 at its lower end. The distance between the laterally offset end portions 36 and 38 is substantially the same as the distance from the upper end of the side wall 12 to the lower end thereof wherein the flange 38 will abut and engage the flange 22 and urge the flange to a position substantially perpendicular to the side wall 12 thereby placing the flange 22 in its extended or supporting position. The upper offset portion 36 of the rod 30 engages the upper flange 14 for supporting the rod 30 and also the flanges 22 in an obvious manner. In the specific embodiment as illustrated, the offset portions 36 and 38 extend in the same direction in parallel relation to each other wherein the person utilizing the egg basket 10 may determine the position of the flanges 22 by observing the upper offset portion 36 of the rod 30 wherein when the rod 36 is positioned inwardly of the side walls 12, the flanges 22 are supported in perpendicular relation to the side walls 12. When the flanges 22 are supported in inwardly extending position a cardboard egg mape 40 may be positioned on the upper surfaces thereof wherein the side walls 12 form an enclosure substantially the same size as the egg mape 40 thereby assuring that the inwardly extending flanges 22 will support the egg mape 40 and the eggs 42 positioned thereon as well as the egg filler 44. It will be understood that the egg mape 40 is provided with a plurality of concave seats for supporting the eggs 42 and the filler 44 includes a plurality of compartments for spacing the eggs 42 from each other. The mape 40 and the fillers 44 are stacked on top of each other in the usual manner and the egg basket 10 is substantially the half of an egg case indicated by the egg case 46 is divided into two separate partition 48 and also is provided with . It will be seen that a suitable spring ovided over the upper edge of one of for supporting the mapes and fillers and a pair of hook members 54 may e of the side walls 12 for detachably le bag 56 which may be utilized for gs or dirty eggs thereby retaining the sket of uniform size and clean. Ob- may be removed and when the egg all of the mapes and fillers secured l be used thereby permitting the egg escoped into one-half of the egg case illustrated in Figure 3. After the n positioned in the egg case 46, the 6 of the rod 30 are pivoted about the f the rod thereby pivoting the lower ut of engagement with the flanges 22 the flanges to pivot downwardly about nd permitting the stacked mapes 40, 42 to be deposited on the bottom of hout breakage of the eggs and without eggs such as is necessary in the normal dure. After the flanges 22 have been me a position parallel to the side walls sket 10 may then be withdrawn from reby leaving the stacked mapes, fillers d on the bottom of the egg case 46 se may then be closed and shipped as rated, only a pair of the fillers 44 is be understood that five of the fillers erein fifteen dozen eggs are placed in gg case 46 which is the standard size industry. Obviously, the device may any suitable sheet material which is weight for easy handling but which satisfy the requirements of a device of basket 10 of the present invention will e collection of the eggs 42 from the d also eliminate the usual re-handling ary for placing the eggs from a con- to the conventional egg case.

oing, the construction and operation be readily understood and further ex- ed to be unnecessary. However, since tions and changes will readily occur the art, it is not desired to limit the act construction shown and described, suitable modifications and equivalents o, falling within the scope of the apas new is as follows:

t comprising a generally square recep- tacle defined by perpendicularly arranged side walls, a pivotally mounted flap on the lower edge of opposite side walls, depending corner legs on said receptacle, said legs having a length at least equal to the width of the flaps whereby the flaps may pivot from a horizontal position extending inwardly from the side walls to a vertical position between the legs and generally coextensive with the side walls thus leaving the bottom of the receptacle free of obstructions, and means for releasably holding the flaps in horizontal position for supporting a plurality of stacked mapes and egg case fillers thereon with the mapes and fillers extending substantially throughout the cross-sectional area of the receptacle, said holding means being releasable from the upper end of the receptacle thus permitting the receptacle to be inserted into an egg case and the flaps released for discharging the mapes and fillers vertically into the egg case through the bottom of the receptacle and permitting withdrawal of the receptacle.

2. An egg basket comprising a receptacle having side walls, pivotally mounted projections on the bottom free edge of at least two of said side walls, and means for actuating said projections, said means terminating adjacent the upper free edges of said side walls, said side walls forming a receptacle for receiving egg case mapes and fillers in vertically stacked relation with eggs positioned in the fillers wherein the eggs, mapes and fillers may be positioned in the basket while collecting eggs and deposited in an egg case without rehandling the eggs, said actuating means including an elongated rod rotatably mounted on each of the side walls having a pivotal projection thereon, said rod having laterally extending end portions with the upper end portion forming a handle and the lower end portion abutting the pivotal projection for selectively positioning said projection, said laterally extending end portions being spaced apart a distance substantially equal to the length of the side walls and arranged so that the handle forming portion engages the upper edge of the side wall when the projection abutting portion engages the projection thereby securely retaining the projections perpendicular to said side walls, rotation of the rod in one direction causing the withdrawal of the lower end portion on the rod permitting the projection to swing downwardly thus forming an extension of the side wall and leaving the bottom of the receptacle free of obstructions, rotation of the rod in the other direction causing engagement of the lower end portion with the projection for swinging the projection inwardly to perpendicular relation to the side walls.

References Cited in the file of this patent

UNITED STATES PATENTS

| 1,528,231 | Woodson | Nov. 3, 1925 |
| 1,737,898 | Snowdy | Dec. 3, 1929 |
| 2,138,967 | Harris | Dec. 6, 1938 |